(12) United States Patent
Koguchi et al.

(10) Patent No.: US 8,737,285 B2
(45) Date of Patent: May 27, 2014

(54) DATA RELAY SYSTEM AND OPERATING TIME ALLOCATING METHOD

(75) Inventors: Kazuumi Koguchi, Tokyo (JP); Katsushige Manabe, Tokyo (JP)

(73) Assignee: Mitsubishi Electronic Corporation, Tokyo (JP)

( * ) Notice: Subject to any disclaimer, the term of this patent is extended or adjusted under 35 U.S.C. 154(b) by 472 days.

(21) Appl. No.: 13/122,913

(22) PCT Filed: Sep. 24, 2009

(86) PCT No.: PCT/JP2009/066531
§ 371 (c)(1),
(2), (4) Date: Apr. 6, 2011

(87) PCT Pub. No.: WO2010/041555
PCT Pub. Date: Apr. 15, 2010

(65) Prior Publication Data
US 2011/0205957 A1    Aug. 25, 2011

(30) Foreign Application Priority Data
Oct. 6, 2008   (JP) .................................. 2008-259818

(51) Int. Cl.
*H04B 7/14* (2006.01)
*H04B 7/26* (2006.01)
(52) U.S. Cl.
CPC .................................. *H04B 7/2653* (2013.01)
USPC ........................................................ 370/315
(58) Field of Classification Search
CPC .................................................... H04B 7/2653
USPC ........................................ 370/315, 442–444
See application file for complete search history.

(56) References Cited

U.S. PATENT DOCUMENTS

| 6,735,446 B1 | 5/2004 | Iwata et al. | |
| 6,907,044 B1 * | 6/2005 | Yonge et al. | 370/445 |
| 7,190,686 B1 * | 3/2007 | Beals | 370/337 |

(Continued)

FOREIGN PATENT DOCUMENTS

| JP | 9 153878 | 6/1997 |
| JP | 10 13955 | 1/1998 |
| JP | 2000 286813 | 10/2000 |
| JP | 2001 275152 | 10/2001 |

(Continued)

OTHER PUBLICATIONS

International Search Report issued Dec. 28, 2009 in PCT/JP09/66531 filed Sep. 24, 2009.

(Continued)

*Primary Examiner* — Ricky Ngo
*Assistant Examiner* — Ben H Liu
(74) *Attorney, Agent, or Firm* — Oblon, Spivak, McClelland, Maier & Neustadt, L.L.P.

(57) ABSTRACT

A data relay system includes: a master that functions as a master station of TDMA; slaves that function as slave stations of the TDMA; and REPs that relay communication between the master and the slaves, function as slave stations in a higher-level TDMA system, and function as master stations in lower-level TDMA systems. The master allocates, as a statically allocated time, an operating time once to each of the TDMA systems, sets, as a dynamically allocated time, a time obtained by excluding the statically allocated time from an allocated period, and allocates, based on communication states in the statically allocated time, the dynamically allocated time as operating times of the lower-level TDMA systems.

11 Claims, 10 Drawing Sheets

(56) References Cited

U.S. PATENT DOCUMENTS

| | | | | |
|---|---|---|---|---|
| 7,609,644 | B2* | 10/2009 | Tateson | 370/252 |
| 7,676,236 | B2* | 3/2010 | Nanda et al. | 455/509 |
| 8,248,941 | B2* | 8/2012 | Teyeb et al. | 370/235 |
| 8,274,922 | B2* | 9/2012 | Kwon et al. | 370/278 |
| 8,311,061 | B2* | 11/2012 | Yu et al. | 370/474 |
| 8,325,686 | B2* | 12/2012 | Shao et al. | 370/337 |
| 2009/0245195 | A1* | 10/2009 | Bhattad et al. | 370/329 |
| 2010/0034148 | A1* | 2/2010 | Zhang et al. | 370/328 |
| 2010/0189021 | A1* | 7/2010 | He et al. | 370/311 |
| 2010/0265861 | A1* | 10/2010 | He et al. | 370/311 |

FOREIGN PATENT DOCUMENTS

| | | |
|---|---|---|
| JP | 2001 358797 | 12/2001 |
| JP | 2002 342264 | 11/2002 |
| KR | 10-2004-0084238 A | 10/2004 |
| WO | 2008 007418 | 1/2008 |

OTHER PUBLICATIONS

Extended European Search Report Issued Mar. 22, 2013 in Patent Application No. 09819090.3.

* cited by examiner

FIG.3

|  | Master 10 | REP 20 | REP 30 | REP 40 | REP 50 | REP 60 |
|---|---|---|---|---|---|---|
| FIRST PERIOD | TIME 1 | TIME 2 | TIME 3 | TIME 4 | TIME 5 | TIME 6 |
| SECOND PERIOD | TIME 1<br>TIME 3<br>TIME 5 |  | TIME 2<br>TIME 4<br>TIME 6 |  |  |  |
| THIRD PERIOD | TIME 1 | TIME 2 | TIME 3 | TIME 4 | TIME 5 | TIME 6 |
| FOURTH PERIOD | TIME 1<br>TIME 4 |  |  | TIME 2<br>TIME 5 |  | TIME 3<br>TIME 6 |
| FIFTH PERIOD | TIME 1 | TIME 2 | TIME 3 | TIME 4 | TIME 5 | TIME 6 |
| SIXTH PERIOD | TIME 1<br>TIME 5 | TIME 2<br>TIME 6 |  | TIME 3 | TIME 4 |  |
| SEVENTH PERIOD | TIME 1 | TIME 2 | TIME 3 | TIME 4 | TIME 5 | TIME 6 |
| EIGHTH PERIOD | TIME 1<br>TIME 4 | TIME 5 |  |  | TIME 2<br>TIME 6 | TIME 3 |
| NINTH PERIOD | TIME 1 | TIME 2 | TIME 3 | TIME 4 | TIME 5 | TIME 6 |
| TENTH PERIOD | TIME 1 | TIME 2 | TIME 3 | TIME 4 | TIME 5 | TIME 6 |

FIG.4

| | Master 10 | REP 20 | REP 30 | REP 40 | REP 50 | REP 60 |
|---|---|---|---|---|---|---|
| FIRST PERIOD | TIME 1 | TIME 2 | TIME 3 | TIME 4 | TIME 5 | TIME 6 |
| SECOND PERIOD | TIME 1<br>TIME 3<br>TIME 5 | | TIME 2<br>TIME 4<br>TIME 6 | | | |
| THIRD PERIOD | TIME 7<br>TIME 9<br>TIME 11 | | TIME 8<br>TIME 10<br>TIME 12 | | | |
| FOURTH PERIOD | TIME 1 | TIME 2 | TIME 3 | TIME 4 | TIME 5 | TIME 6 |
| FIFTH PERIOD | TIME 1<br>TIME 4 | | | TIME 2<br>TIME 5 | | TIME 3<br>TIME 6 |
| SIXTH PERIOD | TIME 7<br>TIME 10 | | | TIME 8<br>TIME 11 | | TIME 9<br>TIME 12 |
| SEVENTH PERIOD | TIME 1 | TIME 2 | TIME 3 | TIME 4 | TIME 5 | TIME 6 |
| EIGHTH PERIOD | TIME 1<br>TIME 5 | TIME 2<br>TIME 6 | | TIME 3 | TIME 4 | |
| NINTH PERIOD | TIME 9 | TIME 10 | | TIME 7<br>TIME 11 | TIME 8<br>TIME 12 | |
| TENTH PERIOD | TIME 1 | TIME 2 | TIME 3 | TIME 4 | TIME 5 | TIME 6 |
| ELEVENTH PERIOD | TIME 1<br>TIME 5 | TIME 3 | | | TIME 4 | TIME 2<br>TIME 6 |
| TWELFTH PERIOD | TIME 9 | TIME 7<br>TIME 11 | | | TIME 8<br>TIME 12 | TIME 10 |
| THIRTEENTH PERIOD | TIME 1 | TIME 2 | TIME 3 | TIME 4 | TIME 5 | TIME 6 |
| FOURTEENTH PERIOD | TIME 1 | TIME 2 | TIME 3 | TIME 4 | TIME 5 | TIME 6 |
| FIFTEENTH PERIOD | TIME 1 | TIME 2 | TIME 3 | TIME 4 | TIME 5 | TIME 6 |

FIG.6

|  | TIME 1 | TIME 2 | TIME 3 | TIME 4 | TIME 5 | TIME 6 |
|---|---|---|---|---|---|---|
| FIRST PERIOD | Master 10 | REP 20 | REP 30 | REP 40 | REP 50 | REP 60 |
| SECOND PERIOD | Master 10 | REP 30 | Master 10 | REP 30 | Master 10 | REP 30 |
| THIRD PERIOD | Master 10 | REP 20 | REP 30 | REP 40 | REP 50 | REP 60 |
| FOURTH PERIOD | Master 10 | REP 40 | REP 60 | Master 10 | REP 40 | REP 60 |
| FIFTH PERIOD | Master 10 | REP 20 | REP 30 | REP 40 | REP 50 | REP 60 |
| SIXTH PERIOD | Master 10 | REP 20 | REP 40 | REP 50 | Master 10 | REP 20 |
| SEVENTH PERIOD | Master 10 | REP 20 | REP 30 | REP 40 | REP 50 | REP 60 |
| EIGHTH PERIOD | Master 10 | REP 50 | REP 60 | Master 10 | REP 20 | REP 50 |
| NINTH PERIOD | Master 10 | REP 20 | REP 30 | REP 40 | REP 50 | REP 60 |
| TENTH PERIOD | Master 10 | REP 20 | REP 30 | REP 40 | REP 50 | REP 60 |

FIG.7

| | TIME 1 | TIME 2 | TIME 3 | TIME 4 | TIME 5 | TIME 6 | TIME 7 | TIME 8 | TIME 9 | TIME 10 | TIME 11 | TIME 12 |
|---|---|---|---|---|---|---|---|---|---|---|---|---|
| FIRST PERIOD | Master 10 | REP 20 | REP 30 | REP 40 | REP 50 | REP 60 | | | | | | |
| SECOND PERIOD | Master 10 | REP 30 | Master 10 | REP 30 | Master 10 | REP 30 | Master 10 | REP 30 | Master 10 | REP 30 | Master 10 | REP 30 |
| (THIRD PERIOD) | (Master 10) | (REP 30) | (Master 10) | (REP 30) | (Master 10) | (REP 30) | | | | | | |
| FOURTH PERIOD | Master 10 | REP 20 | REP 30 | REP 40 | REP 50 | REP 60 | | | | | | |
| FIFTH PERIOD | Master 10 | REP 40 | REP 60 | Master 10 | REP 40 | REP 60 | Master 10 | REP 40 | REP 60 | Master 10 | REP 40 | REP 60 |
| (SIXTH PERIOD) | (Master 10) | (REP 40) | (REP 60) | (Master 10) | (REP 40) | (REP 60) | | | | | | |
| SEVENTH PERIOD | Master 10 | REP 20 | REP 30 | REP 40 | REP 50 | REP 60 | | | | | | |
| EIGHTH PERIOD | Master 10 | REP 20 | REP 40 | REP 50 | Master 10 | REP 20 | REP 40 | REP 50 | Master 10 | REP 20 | REP 40 | REP 50 |
| (NINTH PERIOD) | (REP 40) | (REP 50) | (Master 10) | (REP 20) | (REP 40) | (REP 50) | | | | | | |
| TENTH PERIOD | Master 10 | REP 20 | REP 30 | REP 40 | REP 50 | REP 60 | | | | | | |
| ELEVEN PERIOD | Master 10 | REP 50 | REP 60 | REP 20 | Master 10 | REP 50 | REP 60 | REP 20 | Master 10 | REP 50 | REP 60 | REP 20 |
| (TWELVE PERIOD) | (REP 60) | (REP 20) | (Master 10) | (REP 50) | (REP 60) | (REP 20) | | | | | | |
| THIRTEENTH PERIOD | Master 10 | REP 20 | REP 30 | REP 40 | REP 50 | REP 60 | | | | | | |
| FOURTEENTH PERIOD | Master 10 | REP 20 | REP 30 | REP 40 | REP 50 | REP 60 | Master 10 | REP 20 | REP 30 | REP 40 | REP 50 | REP 60 |
| (FIFTEENTH PERIOD) | (Master 10) | (REP 20) | (REP 30) | (REP 40) | (REP 50) | (REP 60) | | | | | | |

# DATA RELAY SYSTEM AND OPERATING TIME ALLOCATING METHOD

FIELD

The present invention relates to a data relay system that performs data relay between apparatuses arranged at long distances or among a large number of apparatuses and an operating time allocating method.

BACKGROUND

There is a TDMA (Time Division Multiple Access) system as a system for media access control (MAC). The TDMA system is access control in performing communication between a master (a master station) and a plurality of slaves (slave stations). The stations access a medium (a cable, radio, a power line, etc.) in a time division manner. The TDMA system has a characteristic in that the slaves can be efficiently accommodated.

The TDMA system is adopted on condition that communication between the master and the slaves is performed. To apply the TDMA system between apparatuses at a long distance and perform communication, the communication is possible, for example, if the apparatuses are connected by an optical fiber in which a signal is not attenuated between the master and the slaves even at a long distance. However, when the radio or the power line is used, attenuation of a signal is large compared with the optical fiber. Therefore, in a communication system in which the master and the slaves are at a long distance, the communication to which the TDMA system is applied cannot be performed unless the communication system is changed. Therefore, to perform communication at a long distance, it is necessary to relay the signal between the master and the slaves.

In general, there is a limit in the number of slaves that the master can handle. To communicate with the slaves exceeding the number, it is necessary to configure the master and the slaves in multiple stages and relay a signal. For example, an automatic meter reading system that notifies meter values of a large number of energy meters through PLC (Power Line Communication) adopts a configuration in which repeaters are used as masters to accommodate a large number of slaves that can be accommodated therein and a master for the entire system further accommodates these repeaters. The slaves notify the masters of meter values respectively through the repeaters.

On the other hand, when only limited frequency channels can be used in a wireless LAN, a PLC, or the like, a distance between nodes allocated with the same frequency is often not sufficient and interference occurs. To prevent the occurrence of the interference, Patent Literature 1 described below proposes a method of relaying a signal in the TDMA system using the same frequency.

Patent Literature 1 proposes a relay method for preventing, even if a single frequency is used, interference from occurring by switching to perform among, at every TDMA frame time, a master operation in which a repeaters operate as master stations, a slave operation, and a pause operation in which the repeaters operate as slave stations. For example, in unit of three frame times of a frame of the TDMA, a master, a repeater A, and a repeater B connected to the repeater A apply, in order, the operation of the master station to slaves accommodated therein. Patent Literature 1 proposes a system in which the master and the repeaters operate in order in this way, whereby the master and the repeaters can communicate with each other without interfering even at the same frequency.

Patent Literature 1 also proposes a method of causing, rather than causing TDMA systems (master-slave systems including masters and repeating apparatuses or repeating apparatuses and slaves) to operate once equally for each of apparatuses, a specific TDMA system to operate a plurality of times in an entire operating period to increase an operation frequency of the TDMA system and improve throughput of the apparatuses in the system. Further, Patent Literature 1 also proposes a method of notifying an operation table describing operating times from a top master to subordinate repeaters and slaves to dynamically change the operating times.

CITATION LIST

Patent Literature

Patent Literature 1: International Patent Publication No. 08/007418

SUMMARY

Technical Problem

However, according to the conventional technology described in Patent Literature 1, in the method of causing each of the master operation and the slave operation to equally operate once, there is a problem in that communication corresponding to a communication traffic state cannot be performed and efficient communication cannot always be realized.

The method of dynamically changing the operating times in the conventional technology described in Patent Document 1 adopts a system for, in changing the operating times, after notifying all apparatuses of the operation table, notifying all the apparatuses of switching timing to a new operation table and then switching the operation table. Therefore, there is a problem in that it takes time to switch the operating times. When a network configuration is changed to add a repeating apparatus, even if the change takes time, only the repeater to be added is affected. This poses no problem. However, when it is desired to dynamically change the operating times according to a communication traffic amount, if the switching takes time, it is likely that the traffic amount changes during the switching and the operating times cannot be appropriately changed. Therefore, it is necessary to change the operating times in as a short time as possible in such a degree that the change in the communication traffic amount does not pose a problem.

The technology described in Patent Document 1 does not indicate, when the operating times are dynamically changed, how the operating times are allocated to the TDMA systems. Therefore, there is a problem in that appropriate operating times corresponding to a communication traffic state cannot always be allocated.

The present invention has been devised in view of the above and it is an object of the present invention to obtain a data relay system and an operating time allocating method that can dynamically perform switching of allocation of operating times according to a communication traffic state and reduce time for the switching.

Solution to Problem

A data relay system according to the an aspect of present invention includes: a master station apparatus that functions as a master station conforming to TDMA; slave station apparatuses that function as slave stations conforming to the TDMA; and repeating apparatuses that relay communication between the master station and the slave stations, function as slave stations in a higher-level TDMA system, which is a TDMA system including the master station apparatus as a master station, and function as master stations in lower-level TDMA systems, which are TDMA systems including the slave station apparatuses as slave stations, wherein the master station apparatus allocates, as a statically allocated time, an operating time once to each of the higher-level TDMA system and the lower-level TDMA systems, sets, as a dynamically allocated time, a time obtained by excluding the operating time from a predetermined allocated period, allocates, based on states of communication with the repeating apparatuses in the statically allocated time, the dynamically allocated time as operating times of the lower-level TDMA systems, and transmits an allocation result to the repeating apparatuses, and the repeating apparatuses extract, based on the allocation result received by the repeating apparatuses, times allocated to the own apparatuses and operate as the master stations in the times.

Advantageous Effects of Invention

In the data relay system and the operating time allocating method according to the present invention, a master apparatus communicates with all repeating apparatuses in a first operating period of the entire operating period. The master apparatus sets the next and the subsequent operating periods in the entire operating period as targets of dynamic allocation of operating times, and allocates, based on states of communication with the repeating apparatuses, the operating times which are the dynamic allocation targets to the own apparatus and the repeating apparatuses. The master apparatus notifies the repeating apparatuses of a result of the allocation at the beginning of the operating times as the dynamic allocation targets while including the result of the allocation in the beacon. Therefore, there is an effect that it is possible to dynamically switch the allocation of the operating times according to a communication traffic state and reduce time for the switching.

BRIEF DESCRIPTION OF DRAWINGS

FIG. 3 is a diagram of an operation allocation example of the relay system shown in FIG. 1.

FIG. 4 is a diagram of an example of operation allocation in the case of N=3.

FIG. 6 is a diagram of an example of operating time information in the case of an operation example shown in FIG. 3.

FIG. 7 is a diagram of an example of operating time information in the case of an operation example shown in FIG. 4.

DESCRIPTION OF EMBODIMENTS

Embodiments of a data relay system and an operating time allocating method according to the present invention are explained in detail based on the drawings. The present invention is not limited by the embodiments.

First Embodiment

Figure 1:
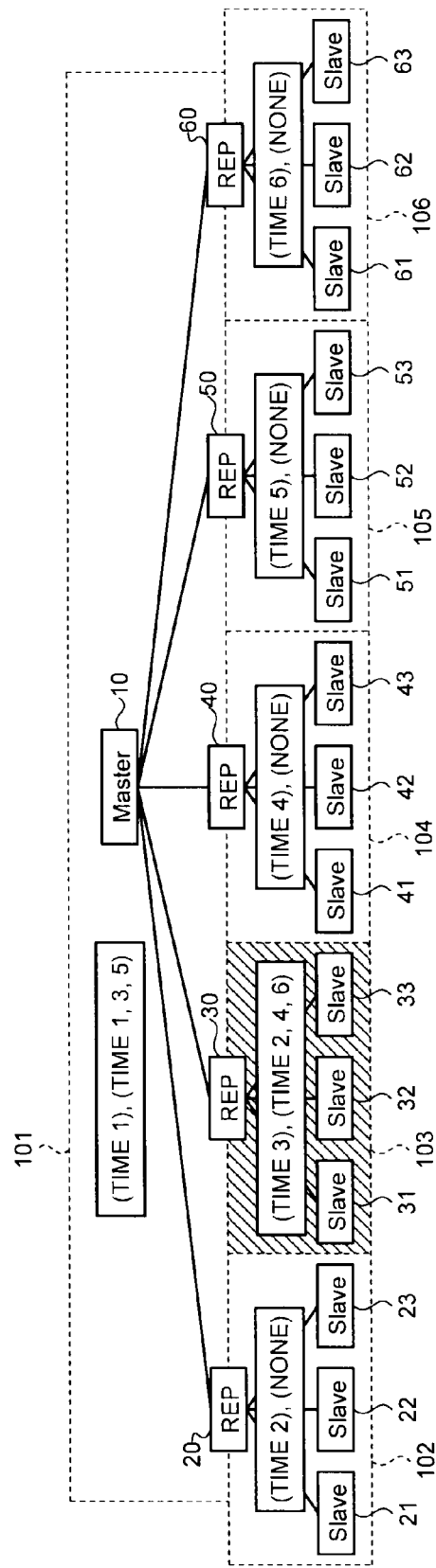
FIG. 1 is a diagram of a configuration example of a first embodiment of a data relay system according to the present invention.

FIG. 1 is a diagram of a configuration example of a first embodiment of the data relay system according to the present invention. As shown in FIG. 1, the data relay system according to this embodiment includes a master 10 as a master apparatus in the TDMA system, repeaters (hereinafter abbreviated as REPs) 20, 30, 40, 50, and 60 as repeating apparatuses in the TDMA system, and slaves 21 to 23, 31 to 33, 41 to 43, 51 to 53, and 61 to 63 that function as slave apparatuses of the repeaters. In FIG. 1, the number of slaves is three per one REP. However, operations same as operations explained below can be executed even when the number of slaves increases to a maximum number of slaves that can be accommodated in the TDMA system.

The REPs 20, 30, 40, 50, and 60 are apparatuses that execute both a master operation in which the REPs function as master apparatuses and a slave operation in which the REPs function as slave apparatuses. The REPs 20, 30, 40, 50, and 60 switch and execute the master operation and the slave operation according to time.

It is assumed that all the apparatuses shown in FIG. 1 operate at a single frequency F1. Therefore, it is assumed that, to prevent interference, only one apparatus performs the master operation of the TDMA in every frame time of the TDMA. Specifically, six individual TDMA systems operate in each of times allocated to the TDMA systems. The six individual TDMA systems include one TDMA system 101 that operates including the master 10 as a master apparatus and including the REPs 20, 30, 40, 50, and 60 as slave apparatuses and five TDMA systems 102 to 106 including the respective REPs 20, 30, 40, 50, and 60 as master apparatuses and including the slaves 21 to 23, 31 to 33, 41 to 43, 51 to 53, and 61 to 63 accommodated by the REPs 20, 30, 40, 50, and 60 as slave apparatuses.

An operating period of the data relay system according to this embodiment are six frame times obtained by multiplying frame time with a total number of the number of masters and the number of REPs (i.e., the number of TDMA systems). The six frame times of the operating period are referred to as time 1, time 2, time 3, time 4, time 5, and time 6 in order in frame time unit. In the conventional technology, for example, operating time is allocated to each of the TDMA systems once in the six frame times. For example, times in which the master 10 and the REPs 20, 30, 40, 50, and 60 perform the master operation are allocated to the time 1, the time 2, the time 3, the time 4, the time 5, and the time 6, respectively. However, for example, in this state, when only the slaves 31 to 33 subordinate to the REP 30 perform communication with the master 10 and the slaves subordinate to the other REPs do not perform communication at all, communication data flows in the time 1 and the time 3 and communication data does not flow in the times 2, 4, 5, and 6.

Therefore, communication cannot be efficiently performed in the system as a whole. On the other hand, if the operating times can be dynamically changed according to communication states, efficiency of communication is improved and delay time is reduced. For example, in this case, if the times 2, 4, 5, and 6 can also be set as operating time (time in which the REP 30 performs the master operation) of the TDMA system of the REP 30, it is possible to reduce delay time to be shorter and increase throughput to be larger than those at the time when the TDMA system operates once in six operating periods.

Therefore, in this embodiment, as explained below, the operating times are dynamically changed according to communication states. The following points need to be noted concerning operating time allocation.

a) In the TDMA system, apparatuses that function as slaves of the TDMA (hereinafter referred to as slave operating apparatuses) need to synchronize with a clock of an apparatus that functions as a master (hereinafter referred to as master operating apparatus). Therefore, in the TDMA system, the master operating apparatus transmits a signal (a beacon) indicating a TDMA period and the slave operating apparatuses receive the beacon to thereby synchronize with the master operating apparatus (clock synchronization). Therefore, in this embodiment, when the operating times are dynamically allocated, it is necessary to allocate operation timings at predetermined time intervals to all the REP irrespective of presence or absence of communication data such that the slaves 21 to 23, 31 to 33, 41 to 43, 51 to 53, and 61 to 63 at the end do not cause out-of-synchronization, transmit a beacon, and prevent out-of-synchronization.

b) For purposes other than the clock synchronization, to grasp presence or absence of communication data between the REPs and the slaves, it is necessary to sometimes allocate the operating times to all the REPs.

c) To dynamically change the operating times, it is necessary to determine operating times at the time when the master 10 at the top and the REPs function as master operating apparatuses and notify the REPs 20, 30, 40, 50, and 60 of a result of the determination. It is necessary to specify a method for this notification.

d) When the notification of the operating times in c) takes time, it is likely that communication states change (an apparatus starts communication anew). Therefore, it is desirable to notify the operating times early.

In this embodiment, the operating periods are allocated to the TDMA systems taking into account a) to d) above. In FIG. 1, a time (an operating time) in which an operation is allocated to each of the TDMA systems 102 to 106 within a double operating period (=twelve frame times) is indicated by a numerical value. A numerical value in parentheses on the left side indicates a time (in frame time unit) when the TDMA system operates in first operating period time (in first period). An operating time of the operating period in the second time is shown in parentheses on the right side.

In the example shown in FIG. 1, the master 10 operates in the time 1 of the first operating period (a first period) and performs the master operation in the times 1, 3, and 5 in a second operating period (a second period) (an operating time is allocated to the TDMA system 101). Therefore, the master 10 operates for four frame times in twelve frame times. The REP 20 performs the master operation in the time 2 of the first operating period (an operating time is allocated to the TDMA system 102). The REP 20 does not perform the master operation in any time in the second operating period. Therefore, the REP 20 operates for one frame time in the twelve frame times. Similarly, the REP 40, the REP 50, and the REP 60 (corresponding to the TDMA systems 104, 105, and 106) perform the master operation for one frame time in the twelve frame times. The REP 30 performs the master operation in the time 3 of the first operating period (an operating time is allocated to the DMA system 103) and operates in the times 2, 4, and 6 in the second operating period. Therefore, the REP 30 operates for four frame times in the twelve frame times.

On the other hand, in the case of the conventional technology for allocating the operating time to each of the TDMA systems once in one operating period, each of the TDMA systems operates for two frame times in the twelve frame times. In this embodiment, compared with the conventional technology, the number of times of operations of communication between the slaves 31 to 33 subordinate to the REP 30 and the master 10 increases. Therefore, in the communication of the slaves 31 to 33 subordinate to the REP 30, data amounts (throughput) that can be transmitted are large and delay time can be reduced. In other words, in this embodiment, when communication of data amounts equal to or larger than a predetermined threshold is performed between the REP and the slaves subordinate to the REP, the operating times are preferentially allocated to the TDMA system to which the REP and the slaves belong.

In this case, concerning communication between the slaves subordinate to the REPs 20, 40, 50, and 60 and the master 10, throughput and the performance of delay are deteriorated because the number of times of operations decreases. However, when a communication frequency is low, communication of a fixed amount can be finished earlier in the operating time allocation in this embodiment. For example, when a file requiring four frame times for transfer is transferred from the slave 31 to the master 10, the transfer takes 6×4=24 frame times when the slave 31 and the master 10 can operate only one frame time in six frame times. However, in this embodiment, because the four frame times are allocated in the twelve frame times, the file transfer is completed in the twelve frame times.

Figure 2:
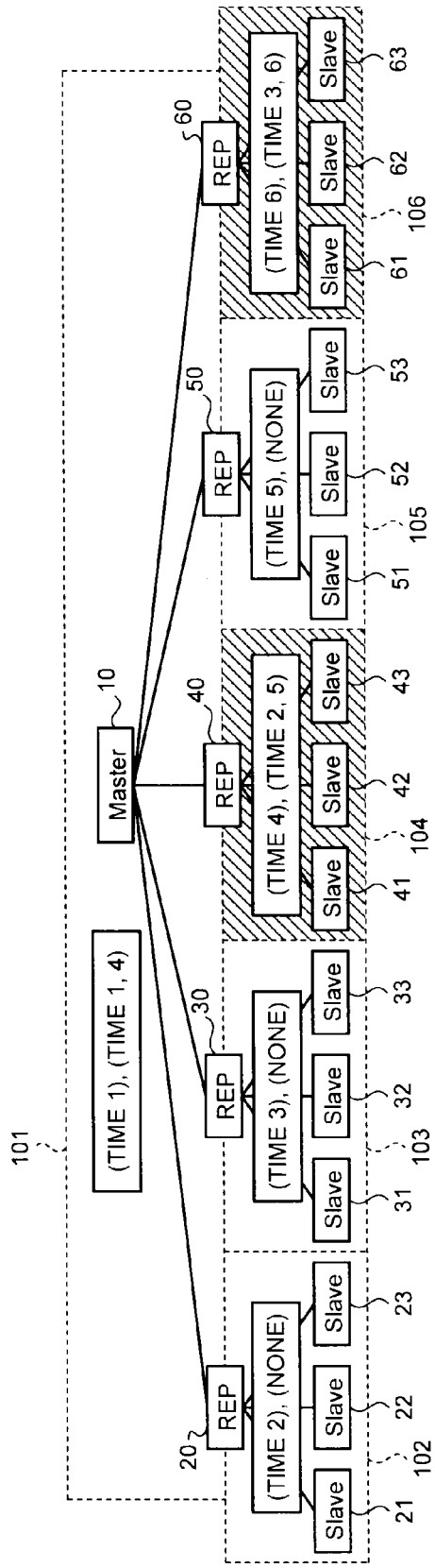
FIG. 2 is a diagram of another example of operating time allocation according to the first embodiment.

FIG. 2 is a diagram of another example of the operating time allocation in this embodiment. In the example shown in FIG. 2, operating times are allocated when the REP 40 and the slaves 41 to 43 subordinate to the REP 40 perform communication of data amounts equal to or larger than the threshold, the REP 60 and the slaves 61 to 63 subordinate to the REP 60 also perform communication of data amounts equal to or larger than the threshold, and communication is not performed or only communication of data amounts smaller than the threshold is performed between the other REPs and the other slaves. In FIG. 2, as in FIG. 1, for each of the TDMA systems, a numerical value in parentheses on the left side indicates a time in which the TDMA system operates in operating period time in the first period, and an operating time of the second operating period is shown in parentheses on the right side. In the case of FIG. 2, operating times are allocated to each of the TDMA 104 and the TDMA 106 twice in the second period. No operating time is allocated to the TDMA systems 102, 103, and 105 in the second period.

In this way, in this embodiment, it is possible to improve throughput and the performance of delay time by allocating more operating periods to the TDMA systems to which the apparatuses performing communication belong.

The operations and the effects corresponding to the allocation of the operating times are explained above. A method of allocating the operating times and a method of notification to the apparatuses are explained below. First, the operating time allocating method is explained. It is assumed that the master 10 performs this operation allocation.

(1) An entire operating period includes N operating periods. In one (one period) among the N operating periods of the entire operating period, the operating times are certainly allocated to all the TDMA systems. This is allocation corresponding to the time in the parentheses on the left side among the operating times shown in each of the TDMA systems in FIGS. 1 and 2. In the examples shown in FIGS. 1 and 2, N=2. N is determined based on clock synchronization performance as explained later. In the examples shown in FIGS. 1 and 2, the operating times are allocated to each of the TDMA systems once in the first period. However, the present invention is not limited to this. The allocation can be performed once in N times in the periods other than the first period.

(2) The master 10 can communicate with all the REPs subordinate to the master 10 according to the allocation of (1) (the time 1 of the parentheses on the left side in FIGS. 1 and 2). Therefore, the master 10 grasps, based on the communication, the REPs in which communication in uplink (in a direction from the REPs 20, 30, 40, 50, and 60 to the master 10) or downlink (a direction from the master 10 to the REPs 20, 30, 40, 50, and 60) is performed (communication of data amounts equal to or larger than the threshold is performed).

(3) In the operating times other than those allocated once to each of the TDMA systems in (1) (the operating periods (six frames) for (N−1) times, the master 10 allocates in order, based on order set in advance in advance, the operating times to the REPs and the master 10 that perform communication based on communication states grasped in (2) (in FIGS. 1 and 2, allocation corresponding to the time in the parentheses on the right side among the allocated times shown in each of the TDMA systems). In other words, in this embodiment, concerning the operating periods for (N−1) times, allocation is dynamically performed according to communication states. Incidentally, among the operating periods in which the master 10 performs dynamic allocation to notify the REPs of the operating times, the time 1 is operating time of the master 10.

(4) The master 10 stores a REP number (an identification number of the REP) to which the operating time is allocated last in (3). In the next dynamic allocated period, the master 10 allocates the operating times in order from the REP having the next number.

(5) Based on the result grasped in (2), when communication is not performed with any REPs (communication of data amounts equal to or larger than the threshold is performed with no REP), the master 10 equally allocates the operating times to all the REPs.

A value of N explained in (1) is a value determined based on synchronization performance (clock synchronization performance) of the TDMA system. In the TDMA system, the master operating apparatus (including the master operation of the REPs) transmits, for synchronization, a signal called beacon at the start of each of frame times. The slave apparatuses (including the slave operation of the REPs) subordinate to the master operating apparatus receive the beacon and synchronize with a clock of the master apparatus based on the beacon. If there is no repeating apparatus and no pause period, the beacon can be received at each frame time. However, when there is a repeating apparatus and the repeating apparatus intermittently operates, there is frame time in which the beacon is not received. In this frame time, the slave operating apparatuses operate at free-running clocks. Therefore, if the beacon is not received, the synchronization with the master gradually shifts. Here, a longest beacon reception interval at which a synchronization error is within a tolerance is synchronization performance. The synchronization performance depends on, for example, accuracy of a quartz oscillator that generates a clock or environmental temperature around the apparatuses. In the examples shown in FIGS. 1 and 2, because N=2, operating time allocation for enabling the slave to receive a beacon at least once in 6×2=12 frame times is performed.

FIG. 3 is a diagram of an operation allocation example of the relay system shown in FIG. 1. In the lateral direction of FIG. 3, the apparatuses (the master 10 and the REPs) that function as the master operation are shown. In the longitudinal direction, operating periods are shown. In squares, operating times in which the respective apparatuses perform the master operation are shown in frame unit.

In the example shown in FIG. 3, allocation same as that shown in FIG. 1 is performed in the first period and the second period. Allocation same as that shown in FIG. 2 is performed in the third period and the fourth period. Because N=2, an entire operating period includes two periods, i.e., the first period and the second period, the third period and the fourth period, or the fifth period and the sixth period. In the first period, the third period, the fifth period, the seventh period, and the ninth period, an operating time is allocated to each of all the TDMA systems once in order as explained in (1) above.

It is assumed that the master 10 grasps, through communication with the REPs in the time 1 of the first period, that only the REP 30 among the REPs subordinate to the master 10 communicates with the master 10. In the second period, the master 10 alternately allocates, based on a result of the grasp, the time 1 to the time 6 to the master 10 and the REP 30 as explained in (3) above.

It is assumed that the master 10 grasps, through communication with the REPs in the time 1 in the third period, that only the REP 40 and the REP 60 among the REPs subordinate to the master 10 communicate with the master 10. In the fourth period, the master 10 allocates, based on a result of the grasp, the time 1 to the time 6 in order to the master 10, the REP 40, and the REP 60.

It is assumed that the master 10 grasps, through communication with the REPs in the time 1 in the fifth period, that the master 10 communicates with only the REP 20, the REP 40, and the REP 50. In the sixth period, the master 10 allocates, based on a result of the grasp, the time 1 to the time 6 to the four apparatuses, i.e., the master 10, the REP 20, the REP 40, and the REP 50 in order. In the sixth period, because the allocation ends in the REP 20, the master 10 stores an identification number of the REP 20.

It is assumed that the master 10 grasps, through communication with the REPs in the time 1 in the seventh period, that the master 10 communicates with only the REP 20, the REP 50, and the REP 60. In the eighth period, the master 10 allocates, based on a result of the grasp, the time 1 to the time 6 to the four apparatuses, i.e., the master 10, the REP 20, the REP 50, and the REP 60 in order. At this point, because the master 10 stores in the sixth period that the allocation is completed in the REP 20, the master 10 allocates the master 10 in the time 1 and allocates the REPs in the times 2 and the subsequent times in order from the REP 50 next to the REP 20.

It is assumed that the master 10 grasps, through communication with the REPs in the time 1 in the ninth period, the master 10 communicates with none of the REPs. As explained in (5), in the tenth period, the master 10 allocates, based on a result of the grasp, the operating periods to each of all the REPs once in the same manner as the ninth period.

The allocation in the case of N=2 is shown in FIG. 3. Allocation in the case of N=3 is explained below. FIG. 4 is a diagram of an example of operation allocation in the case of N=3. In the example shown in FIG. 4, there are six operating periods and the configuration of the relay system is the same as that shown in FIG. 1. Because N=3, an entire operating period includes three operating periods. As dynamic allocation, allocation for times equivalent to 6×(3−1)=12 frames is performed.

It is assumed that the master 10 grasps, through communication with the REPs in the time 1 in the first period, that the master 10 communicates with only the REP 30. The master 10 alternately allocates, based on a result of the grasp, the time 1 to the time 12 to the master 10 and the REP 30 as twelve times (frames) from the second period. In FIG. 4, the second period and the third period are shown as the twelve times, the time 1 to the time 6 are shown as the second period, and the time 7 to the time 12 are shown as the third period.

It is assumed that the master 10 grasps, through communication with the REPs in the time 1 in the fourth period, that the master 10 communicates with only the REP 40 and the REP 60. In the fifth period and the sixth period, the master 10 allocates, based on a result of the grasp, the time 1 to the time 12 in order to the master 10, the REP 40, and the REP 60.

It is assumed that the master 10 grasps that the master 10 communicates with only the REP 20, the REP 40, and the REP 50 in the time 1 in the seventh period. In the eighth period and the ninth period, the master 10 allocates, based on a result of the grasp, the time 1 to the time 12 in order to the four apparatuses, i.e., the master 10, the REP 20, the REP 40, and the REP 50. At this point, because the allocation ends in the REP 50 in the ninth period, the master 10 stores an identification number of the REP 50.

It is assumed that the master 10 grasps that the master 10 communicates with only the REP 20, the REP 50, and the REP 60 in the time 1 in the tenth period. In the eleventh period and the twelfth period, the master 10 allocates, based on a result of the grasp, the time 1 to the time 12 in order to the four apparatuses, i.e., the master 10, the REP 20, the REP 50, and the REP 60. At this point, the master 10 stores the identification number of the REP 50 in which the allocation ends in the ninth period. Therefore, in the time 2 and the subsequent times, the master 10 allocates the REPs in order from the REP 60 next to the REP 50 (the time 1 needs to be set as operating time of the master 10 to notify the REPs of the operating times).

It is assumed that the master 10 grasps that the master 10 communicates with none of the REPs in the time 1 in the thirteenth period. In the fourteenth period and the fifteenth period, the master 10 allocates the operating times to each of the master 10 and all the REP once in order.

According to the operation explained above, it is possible to allocate more operating times to the TDMA systems to which the REPs performing communication belong. The master 10 needs to notify, until the REPs perform communication in the next period, the REPs of a result of the dynamic allocation performed based on communication states grasped in the time 1 in the first period. A method of notifying the REPs of the operating times is explained below.

(1) The top master 10 determines an entire operating time as explained above. This is a result determined based on information in the time 1 of the first period in which the master 10 can communicate with all the REPs.

(2) The master 10 always allocates the time 1 in the second operating period as the operating time of the master 10. The master 10 transmits a beacon while including operating time information corresponding to (N−1)×operating periods (e.g., in the case of N=2 shown in FIG. 1, information concerning apparatuses of allocation destinations respectively corresponding to the twelve times from the time 1 to the time 12) in the beacon. The REPs receive the beacon for clock synchronization. The REPs recognizes the operating times of the own apparatuses based on the operating time information corresponding to the (N−1)×operating periods included in the beacon.

(3) The slaves monitor, in every time (every frame), whether beacons from the REPs corresponding to the own apparatuses (the top REPs of the own apparatuses) and, when the beacons of the REPs corresponding to the own apparatuses can be received, perform operations of clock synchronization and communication.

Figure 5:
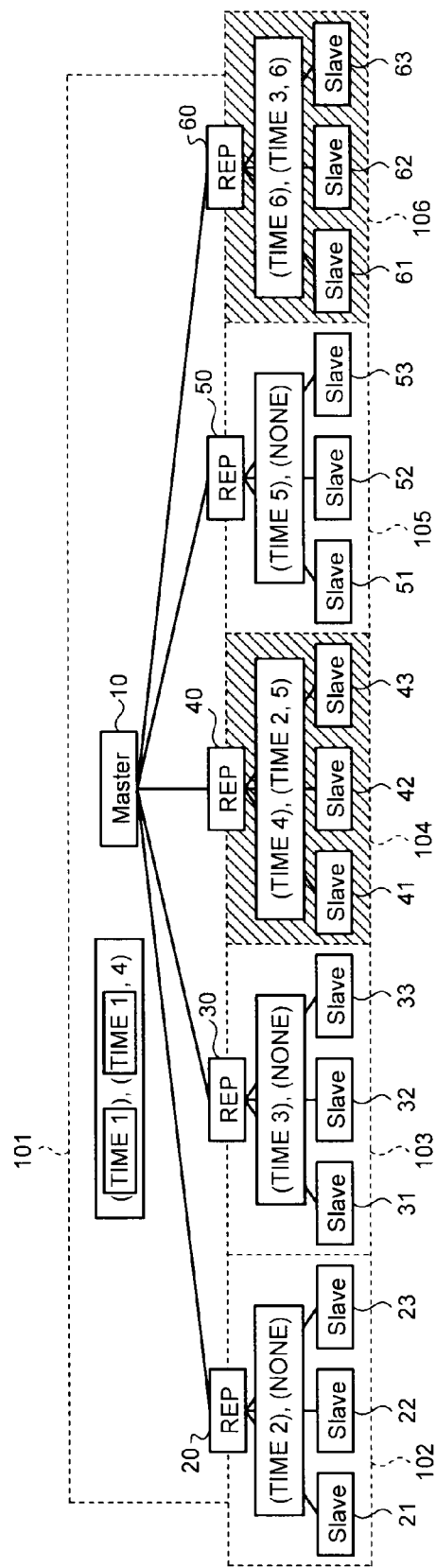
FIG. 5 is a diagram explaining timing for notifying operating times.

FIG. 5 is a diagram for explaining timing for notifying the operation times in the case of the operation example shown in FIG. 3. In the time 1 (the time in the first period) surrounded by a rectangle in parentheses on the left side of two operating times in parentheses shown to correspond to the TDMA system 101 shown in FIG. 5, the master 10 grasps states of communication with the REPs as explained above. In the time 1 surrounded by a rectangle in parentheses on the right side, the master 10 notifies, with a beacon, the REPs of operating time information in the time 2 and the subsequent times in the second period.

FIG. 6 is a diagram of an example of operating time information in the case of the operation example shown in FIG. 3. The periods are shown in the longitudinal direction of FIG. 6. Operating time information notified while being included in a beacon by the master 10 is shown in the lateral direction. In the time 1 equivalent to hatched spaces in FIG. 6, the master 10 transmits the operating time information while including the operating time information in a beacon. Information concerning the periods shown in FIG. 6 is information in which allocation results in the periods are arranged in order of times. In this example, because N=2, in the first transmission, information equivalent to (2−1)×6=6 times is transmitted as the operating time information. It is necessary to notify a result obtained by dynamically allocating the operating times in the second period, the fourth period, the sixth period, and the like while including the result in a beacon. However, concerning periods allocated in order for each time of allocation such as the first period, the third period, the fifth period, and the like, it is unnecessary to notify a result of allocation while including the result in a beacon.

FIG. 7 is a diagram of an example of operating time information in the case of the operation example shown in FIG. 4. In the example shown in FIG. 4, because N=3, the operating time information is information corresponding to (3−1)×6=12 times. However, a period for performing communication with all the REPs like the first period is equivalent to six times. In the time 1 equivalent to hatched spaces in FIG. 7, the master 10 transmits the operating time information while including the operating time information in a beacon. Concerning the third, sixth, ninth, twelfth, and fifteenth periods, because the master 10 transmits the operating time information as the time 7 to the time 12 in the second, fifth, eighth, eleventh, and fourteenth periods, the master 10 does not insert the operating time information in a beacon. Therefore, in FIG. 7, the third, sixth, ninth, twelfth, and fifteenth periods are written in parentheses.

As explained above, in this embodiment, a period N times as large as the operating period is set as the entire operating period. The master 10 communicates with all the REPs in the operating period at the start of the entire operating period, sets the next operating period and the subsequent operating periods in the entire operating period as targets of dynamic allocation of the operating times, and allocates, based on states of communication with the REPs, the operating times as the dynamic allocation targets to the master 10 and the REPs 20, 30, 40, 50, and 60. The master 10 notifies the REPs of a result of the allocation at the start of the operating times as the dynamic allocation targets while including the result in a beacon. Therefore, it is possible to dynamically allocate the operating times according to the communication states and improve throughput and the performance of delay to be better than those in the related art.

Second Embodiment

Figure 8:
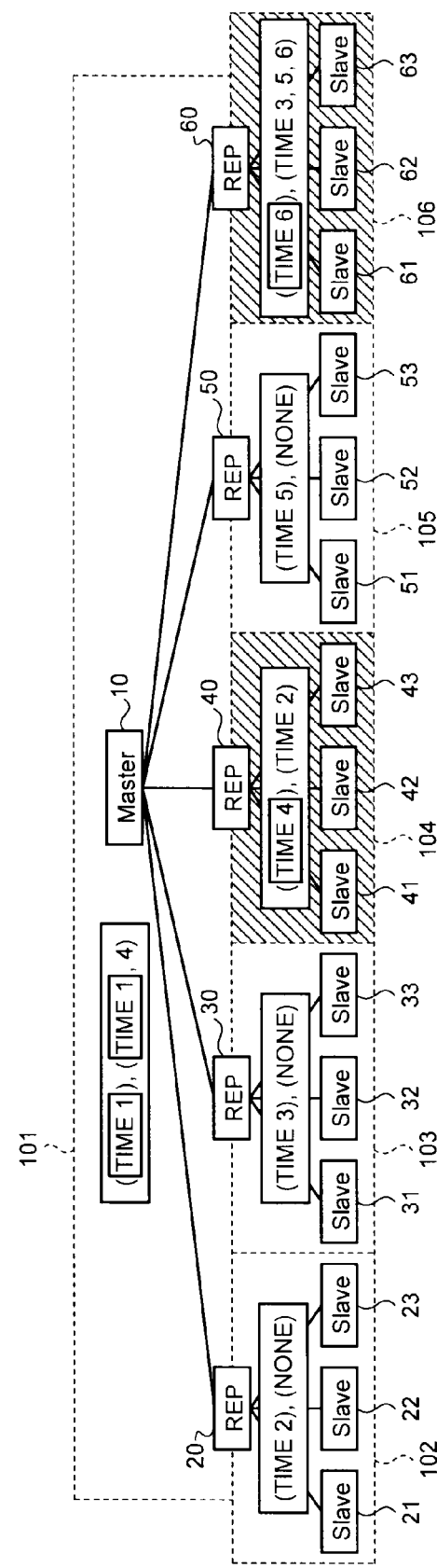
FIG. 8 is a diagram of an example of operating times allocated by an operating time allocating method according to a second embodiment of the present invention.

FIG. 8 is a diagram of an example of operating times allocated by an operating time allocating method according to a second embodiment of the present invention. The configuration of a data relay system according to this embodiment is the same as that in the first embodiment. Components having functions same as those in the first embodiment are denoted by the same reference numerals and explanation of the components is omitted.

In the method adopted in the first embodiment, the master 10 monitors states of communication with the REPs, autonomously determines, based on the communication states, operating times, and allocates the operating times. However, in the second embodiment, the master 10 performs operation allocation as explained below. An operating period in this embodiment is six frames as in the first embodiment.

(1) As in the first embodiment, an entire operating period includes N operating periods. In one (one period) among the N operating periods of the entire operating period, the operating times are certainly allocated to all the TDMA systems.

(2) The master 10 can communicate with all the REPs in the time 1 (the time 1 is allocated to the master 10 in the operating period allocated in (1)) according to the allocation of (1). When there is data that cannot be fully transmitted when uplink direction data is transmitted, the REPs notify the remaining data amounts (uplink data amounts) together with the data.

(3) The master 10 grasps, based on the notification (the uplink data amounts) from the REPs in (2) and a downlink data amount stored by the own master 10, an uplink data amount and a downlink data amount for each of the REPs.

(4) The master 10 allocates, concerning the operating periods for (N−1) times excluding the operating period for one period allocated in (1) in the entire operating period, operation times to the REPs in order from one having a largest total of the uplink data amount and the downlink data amount grasped in (3).

In FIG. 8, the operating times up to the second period are shown to correspond to each of the TDMA systems in the figure. An allocated time in the first period is shown in parentheses on the right side and an allocated time in the second period is shown in parentheses on the left side. In the first period, operating periods are allocated to all the REPs as in the case shown in FIG. 5. At this point, in the first embodiment, when there is data desired to be transmitted, the REPs transmit only the data to the master 10. In this embodiment, as explained above, the REPs transmit, in addition to the transmission data, the remaining data amounts to inform the master 10 to which degree the data desired to be transmitted remains. When no data desired to be transmitted remains, the REPs notify "0".

Concerning the remaining data amounts, the REPs can notify data sizes remaining in transmission buffers of the own apparatuses. When the REPs perform the master operation and communicate with the slaves subordinate to the REPs, the REPs can cause the slaves accommodated therein to notify data sizes remaining in transmission buffers of the slaves in the same manner, add up the remaining data sizes notified from the slaves, and add the data sizes remaining in the transmission buffers of the REPs to the data sizes of the slaves, and notify the added-up data sizes to the master 10 as data amounts.

In FIG. 8, the REPs are not layered and only the slaves are subordinate to the REPs. In the case of a multi-stage configuration in which REPs are further accommodated under the REPs and the slaves are accommodated under the accommodated REPs, it is also possible that the REPs add up remaining data sizes notified from the slaves at the end and remaining data sizes of the REPs themselves. Then, the REPs notify the higher-level REPs of total data sizes, and the higher-level REPs add data sizes remaining in the transmission buffers of the higher-level REPs to the total data sizes notified from the lower-level REPs in order to notify all the remaining data sizes of the subordinate apparatuses as data amounts.

In an example of allocation shown in FIG. 8, there is only communication between the REP 40 and the REP 60 in the time 1 in the first period, a data amount notified from the REP 40 to the master 10 in the time 1 is "100", a data amount notified from the REP 60 is "200", and downlink data is "0". In the case of such data amounts, the master 10 allocates more operating times to the REP 60 than to the REP 40 in the second period, inserts operating time information in a beacon, and transmits a result of the allocation in the time 1 in the second period. In FIG. 8, in the second period, the master 10 allocates the time 2 to the REP 40 and allocates the times 3, 5, and 6 to the REP 60. The master 10 allocates no time to the other REPs (the REPs 20, 30, and 50) in the second period.

An operating time notifying method for notifying an allocation result to the REPs is the same as that in the first embodiment. Operations other than the operations explained above in this embodiment are the same as those in the first embodiment.

As explained above, in this embodiment, the REPs notify the master 10 of uplink data amounts that should be transmitted and the master 10 allocates, based on the uplink data amounts and a downlink data amount managed by the master 10, operating periods as dynamic allocation targets. Therefore, compared with the first embodiment in which communication states are grasped according to only presence or absence of communication, it is possible to perform more appropriate allocation corresponding to data amounts and further improve throughput and the performance of delay than in the first embodiment.

Third Embodiment

Figure 9:
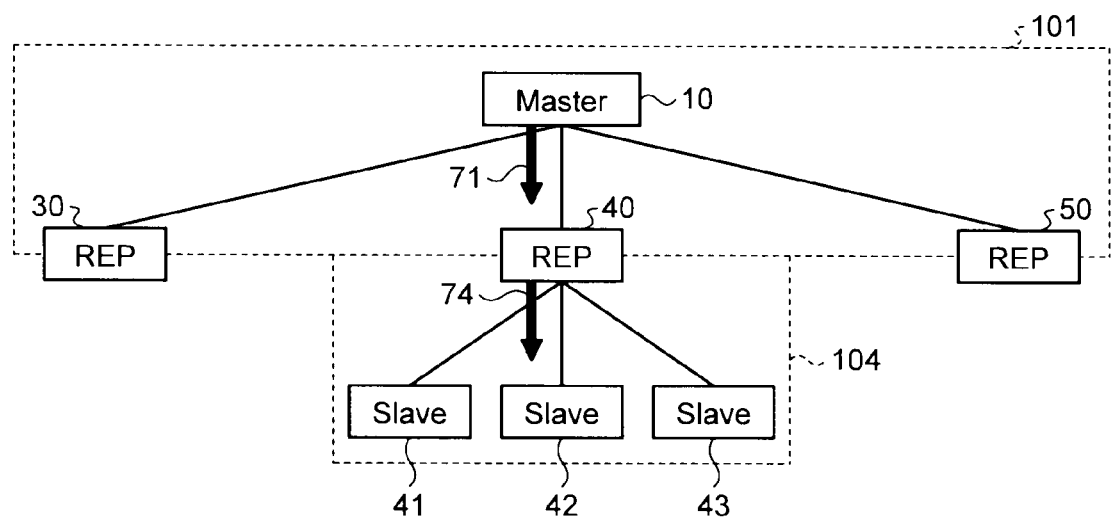
FIG. 9 is a diagram of an example of a method of notifying operating times according to a third embodiment of the present invention.

FIG. 9 is a diagram of an example of a method of notifying operating times according to a third embodiment of the present invention. In a data relay system according to this embodiment, the REP 20, the REP 60, and the slaves subordinate to the REP 20 and the REP 60 are deleted from the data relay system according to the first embodiment. Otherwise, the data relay system according to this embodiment is the same as the data relay system according to the first embodiment. In FIG. 9, the slaves subordinate to the REP 30 and the REP 50 are not shown. However, the subordinate slaves are also present under the REP 30 and the REP 50 as in the first embodiment. Beacons 71 and 74 respectively indicate beacons transmitted by the master 10 and the REP 40. Components having functions same as those in the first embodiment are denoted by the same reference numerals and explanation of the components is omitted.

In the second embodiment, the data amounts are notified from the REPs to the master 10 together with the uplink data in the time 1 allocated as the operating time of the master 10. In the third embodiment, a method of notifying data amounts from the REPs to the master 10 is changed from the method in the second embodiment. An operation time allocating method according to this embodiment is explained bellow.

(1) As in the first embodiment, an entire operating period includes N operating periods. In one (in one period) among the N operating periods of the entire operating period, the operating times are certainly allocated to all the TDMA systems.

(2) The REPs insert presence or absence of data desired to be transmitted to the master 1 and data amounts in beacons and transmits the beacons in operating times of the own apparatuses allocated in (1).

(3) The master 10 receives the beacons transmitted by the REPs in (2). The master 10 grasps, based on the presence or absence of data and the data amounts included in the beacon, whether the REPs need to communicate with the master 10 and, if the REPs communicate with the master 10, data amounts of the communication. In the related art and the first and second embodiments, the master 10 does not operate at all in times (times allocated as operating times of the REPs) other than times allocated to the own apparatus among the operating times allocated in (1). On the contrary, in this embodiment, the master 10 performs beacon reception.

(4) The master 10 allocates, based on presence or absence of downlink data and a downlink data amount of each of the REPs grasped by the master 10 as well as the presence or absence of uplink data and the data amount of each of the REPs grasped in (3), operation times to the REPs in order from one having a largest total data amount.

An operating time notifying method is the same as that in the first embodiment. A method of using beacon information is explained in detail with reference to FIG. 9. In a time when the master 10 performs the master operation, the master 10 transmits the beacon 71 to the subordinate REPs to enable the subordinate REPs to synchronize with the beacon 71.

On the other hand, then the REPs themselves perform the master operation, the REPs transmit beacons to the subordinate slaves to enable the subordinate slaves to synchronize with the beacons. In FIG. 9, the beacon 74 transmitted by the REP 40 is shown. However, the REP 30 and the REP 50 transmit beacons to the subordinate slaves in operating times in which the own apparatuses perform the master operation.

In the related art and the first and second embodiments, when the REPs perform the master operation, the target apparatuses that transmit and receive data in the operating times of the REPs are only the subordinate slaves. In the example shown in FIG. 9, in the time when the REP 40 performs the master operation, the REP 40 communicates with only the slaves 41, 42, and 43. However, the REP 40 and the master 10 are in a positional relation in which the REP 40 and the master 10 can communicate in terms of distance. Therefore, the master 10 can receive the beacon 74 transmitted by the REP 40. This embodiment has a characteristic in that the master 10 receives and uses beacons transmitted by the REPs in this way.

Figure 10:
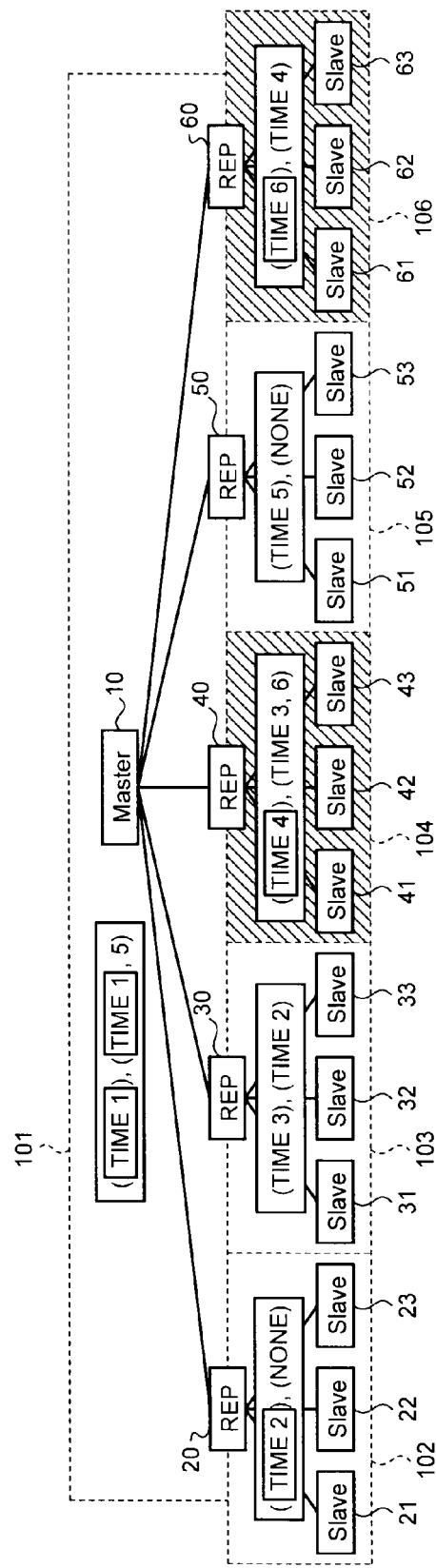
FIG. 10 is a diagram of an example in which an allocating method according to the third embodiment is applied to a data relay system having a configuration same as that in the first embodiment.

This embodiment also has a characteristic in that a data amount of the remaining data transmitted according to data transmission time in the second embodiment is inserted in a beacon. FIG. 10 is a diagram of an example in which the allocation method according to this embodiment is applied to a data relay system having a configuration same as that in the first embodiment. The operation of this embodiment is explained in detail with reference to FIG. 10.

Operating times up to the second period are shown in FIG. 10 for each of the TDMA systems. In the first period (in parentheses on the left side in the figure), operating times are allocated to all the REPs as in the example shown in FIG. 5. At this point, in the first and second embodiments, the master 10 operates only in the time 1 in the first period. However, in the third embodiment, the master 10 monitors beacons transmitted by the REPs in the times 2 to 6 in the first period.

In the times 2 to 6 in the first period, each of the REPs transmits a beacon in the operating time allocated to the own apparatus. At this point, the REP inserts the total of remaining data amounts desired to be transmitted to the master 10 in the beacon and transmits the beacon. In times 2 to 6, the master 10 receives the beacons transmitted from the REPs and can recognize, based on the data amounts included in the beacons, an uplink data amount of each of the REPs. After receiving the beacons in the time 6 in the first period, until the master 10 transmits a beacon in the time 1 in the second period, the master 10 carries out operating time allocation in the next operating period (in this case, the second period) in the same manner as the second embodiment. As in the second embodiment, when the master 10 performs the master operation in the time 1 in the second period, the master 10 inserts operating time allocation information in a beacon and transmits the beacon. Operations other than the operations explained above in this embodiment are the same as those in the first embodiment.

In this embodiment, because the operations explained above are performed, it is possible to grasp uplink data amounts in the times 2 to 6 in the first period. Therefore, compared with the second embodiment in which an uplink data amount is grasped in the time 1 in the first period, it is possible to notify information in a later time and notify more latest information.

In the second embodiment, when communication in an uplink direction occurs between the master 10 and the REPs in the time 1, it is possible notify remaining data amounts together with uplink data. However, when the number of REPs is large or when there is the REP having a large data amount per one REP, it is likely that there are the REPs that cannot transmit uplink data amounts within one frame time of the time 1. In this case, although the master 10 determines that the REPs that cannot transmit the uplink data amounts do not have remaining uplink data amounts, remaining uplink data is actually present in the REPs.

On the other hand, in this embodiment, information is inserted in a beacon to be transmitted by the REP and the beacon is transmitted. Therefore, because the master 10 is not affected by communication of the other REPs in the times 2 to 6 in the first period, the master 10 can grasp remaining data amounts of the REPs.

In the above explanation, the remaining uplink data amount is inserted in a beacon. Alternatively, it is also possible that only presence or absence of data is inserted in a beacon as in the first embodiment and allocation of operating times same as that in the first embodiment is performed. In this case, information added to the beacon only has to be 1 bit. When the remaining data amount is inserted, for example, when an upper limit is set to 4095 bytes (even when the upper limit is equal to or larger than 4095, the upper limit is also notified as 4095 bytes) and notified in 1 byte unit, 12 bits ($2^{12}=4096$) is necessary.

In this way, in this embodiment, the REPs transmit beacons transmitted in operating times allocated to the own apparatuses in the first period while including the remaining uplink data amounts in the beacons. The master 10 receives the beacons and performs, based on the uplink data amounts included in the beacons, allocation of the operating times. Therefore, compared with the first and second embodiments, it is possible to always grasp communication states of all the REPs. Compared with the second embodiment, it is possible to reflect more latest uplink data amounts. Therefore, it is possible to further improve through put and the performance of delay than in the first and second embodiments.

Industrial Applicability

As explained above, the data relay system and the operating time allocating method according to the present invention are useful for a data relay system between apparatuses arranged at long distances or among a large number of apparatuses. In particular, the data relay system and the operating time allocating method according to the present invention are suitable for a data relay system that adopts the TDMA system.

REFERENCE SIGNS LIST

10 MASTER 20, 30, 40, 50, 60 REPs 21 to 23, 31 to 33, 41 to 43, 51 to 53, 61 to 63 SLAVES 101, 102, 103, 104, 105, 106 TDMA SYSTEMS 71, 74 BEACONS

The invention claimed is:

1. A data relay system comprising:
a master station apparatus that functions as a master station in a higher-level TDMA system;
a plurality of slave station apparatuses that function as slave stations in a plurality of lower-level TDMA systems; and
a plurality of repeating apparatuses that relay communication between the master station apparatus and the slave station apparatuses, the repeating apparatuses functioning as slave stations in the higher-level TDMA system and functioning as respective master stations in the plurality of lower-level TDMA systems,
wherein the master station apparatus
allocates an operating time as a statically allocated time with respect to each of the higher-level TDMA system and the plurality of lower-level TDMA systems,
sets, as a dynamically allocated time, a time obtained by excluding the statically allocated time from a predetermined allocated period,
allocates the dynamically allocated time as respective operating times to the higher-level TDMA system and the plurality of lower-level TDMA systems with distribution depending on communication states between the master station apparatus and the plurality of repeating apparatuses in the higher-level TDMA system during the statically allocated time, and
transmits an allocation result to the repeating apparatuses, and
wherein each of the repeating apparatuses extracts, based on the allocation result received from the master station apparatus, the operating time allocated to its own apparatus and operates as the master station in the extracted operating time.

2. The data relay system according to claim 1,
wherein the master station apparatus transmits the allocation result to the repeating apparatuses in a beginning operation time of the dynamically allocated time.

3. The data relay system apparatus according to claim 2, wherein the statically allocated time is prior to the dynamically allocated time in the predetermined allocated period.

4. The data relay system according to claim 1, wherein the communication states are presence or absence of transmission and reception data between the master station apparatus and the repeating apparatuses in the statically allocated time allocated to the higher-level TDMA system.

5. The data relay system according to claim 4, wherein
the repeating apparatuses transmit presence or absence of transmission data to the master station apparatus using beacons for clock synchronization transmitted in the times allocated to their own apparatuses in the statically allocated time, and the master station apparatus grasps, based on the beacons transmitted from the respective repeating apparatuses, the presence or absence of the transmission and reception data.

6. The data relay system according to claim 1, wherein
the communication states are total data amounts of uplink data amounts as remaining amounts of data that are to be transmitted from the slave station apparatuses subordinate to the repeating apparatuses to the master station apparatus in the statically allocated time allocated to the higher-level TDMA system and downlink data amounts as remaining amounts of data to the slave station apparatuses stored by the master station apparatus,
the repeating apparatuses transmit the uplink data amounts together with transmission data to the master station apparatus, and
the master station apparatus allocates the dynamically allocated time to the repeating apparatuses having the total data amounts exceeding a predetermined threshold.

7. The data relay system according to claim 1, wherein
the communication states are total data amounts of uplink data amounts as remaining amounts of data that are to be transmitted from the slave station apparatuses subordinate to the repeating apparatuses to the master station apparatus in the statically allocated time allocated to the higher-level TDMA system and downlink data amounts as remaining amounts of data to the slave station apparatuses stored by the master station apparatus,
the repeating apparatuses transmit the uplink data amounts using beacons for clock synchronization transmitted in the times allocated to their own apparatuses in the statically allocated time, and
the master station apparatus grasps, based on the beacons transmitted from the respective repeating apparatuses, the uplink data amounts.

8. The data relay system according to claim 1, wherein the master station apparatus transmits the allocation result using a beacon for clock synchronization.

9. A master station apparatus, which functions as a master station in a higher-level TDMA system, in a data relay system, the data relay system including:
the master station apparatus;
a plurality of slave station apparatuses that function as slave stations in a plurality of lower-level TDMA systems; and
a plurality of repeating apparatuses that relay communication between the master station apparatus and the slave station apparatuses, the repeating apparatuses functioning as slave stations in the higher-level TDMA system and functioning as respective master stations in the plurality of lower-level TDMA systems,
wherein the master station apparatus
allocates an operating time as a statically allocated time with respect to each of the higher-level TDMA system and the plurality of lower-level TDMA systems,
sets, as a dynamically allocated time, a time obtained by excluding the statically allocated time from a predetermined allocated period,
allocates the dynamically allocated time as respective operating times to the higher-level TDMA system and the plurality of lower-level TDMA systems with distribution depending on communication states between the master station apparatus and the plurality of repeating apparatuses in the higher-level TDMA system during the statically allocated time, and transmits an allocation result to the repeating apparatuses, and wherein each of the repeating apparatuses extracts, based on the allocation result received from the master station apparatus, the operating time allocated to the own apparatus and operates as the master station in the extracted operating time.

10. A repeating apparatus of a plurality of repeating apparatuses in a data relay system, the data relay system comprising:

a master station apparatus that functions as a master station in a higher-level TDMA system;

a plurality of slave station apparatuses that function as slave stations in a plurality of lower-level TDMA systems; and the plurality of repeating apparatuses that relay communication between the master station apparatus and the slave station apparatuses, function as slave stations in the higher-level TDMA system and function as respective master stations in the plurality of lower-level TDMA systems, wherein the master station apparatus allocates an operating time as a statically allocated time with respect to each of the higher-level TDMA system and the plurality of lower-level TDMA systems, sets, as a dynamically allocated time, a time obtained by excluding the statically allocated time from a predetermined allocated period, allocates the dynamically allocated time as respective operating times to the higher-level TDMA system and the plurality of lower-level TDMA systems with distribution depending on communication states between the master station apparatus and the plurality of repeating apparatuses in the higher-level TDMA system during the statically allocated time, and transmits an allocation result to the repeating apparatuses, and wherein the repeating apparatus extracts, based on the allocation result received from the master station apparatus, the operating time allocated to its own apparatus and operates as the master station in the extracted operating time.

11. An operating time allocating method in a data relay system, the data relay system including:

a master station apparatus that functions as a master station in a higher-level TDMA system;

a plurality of slave station apparatuses that function as slave stations in a plurality of lower-level TDMA systems; and a plurality of repeating apparatuses that relay communication between the master station apparatus and the slave station apparatuses, function as slave stations in the higher-level TDMA system and function as respective master stations in the plurality of lower-level TDMA systems, the operating time allocating method comprising:

a static allocation in which the master station apparatus allocates an operating time as a statically allocated time with respect to each of the higher-level TDMA system and the plurality of lower-level TDMA systems;

a dynamic allocation in which the master station apparatus sets, as a dynamically allocated time, a time obtained by excluding the statically allocated time from a predetermined allocated period and allocates the dynamically allocated time as respective operating times to the higher-level TDMA system and the plurality of lower-level TDMA systems with distribution depending on communication states between the master station apparatus and the plurality of repeating apparatuses in the higher-level TDMA system during the statically allocated time;

a result transmitting in which the master station apparatus transmits the allocation result to the repeating apparatuses; and an operating in which each of the repeating apparatuses extracts, based on the allocation result received from the master station apparatus, the operating time allocated to their own apparatus and operates as the master station in the extracted operating time.

\* \* \* \* \*

UNITED STATES PATENT AND TRADEMARK OFFICE
CERTIFICATE OF CORRECTION

| | |
|---|---|
| PATENT NO. | : 8,737,285 B2 |
| APPLICATION NO. | : 13/122913 |
| DATED | : May 27, 2014 |
| INVENTOR(S) | : Kazuumi Koguchi et al. |

It is certified that error appears in the above-identified patent and that said Letters Patent is hereby corrected as shown below:

On the title page, Item (73), The Assignee's information is incorrect, Item (73) should read:

-- (73) Assignee: Mitsubishi Electric Corporation, Tokyo (JP) --

Signed and Sealed this
Ninth Day of September, 2014

Michelle K. Lee
*Deputy Director of the United States Patent and Trademark Office*